United States Patent
Moore

(10) Patent No.: US 8,960,378 B2
(45) Date of Patent: Feb. 24, 2015

(54) BRAKE BLOCK FOR BICYCLE

(71) Applicant: Wayne-Ian Moore, Changhua County (TW)

(72) Inventor: Wayne-Ian Moore, Changhua County (TW)

(73) Assignee: Ashima Ltd., Changhua (TW)

( * ) Notice: Subject to any disclaimer, the term of this patent is extended or adjusted under 35 U.S.C. 154(b) by 142 days.

(21) Appl. No.: 13/633,112

(22) Filed: Oct. 1, 2012

(65) Prior Publication Data

US 2013/0020151 A1    Jan. 24, 2013

Related U.S. Application Data

(63) Continuation-in-part of application No. 12/753,115, filed on Apr. 2, 2010, now abandoned.

(51) Int. Cl.
- *B62L 3/00* (2006.01)
- *F16D 69/02* (2006.01)
- *F16D 65/092* (2006.01)
- *F16D 69/00* (2006.01)

(52) U.S. Cl.
CPC .............. *F16D 69/02* (2013.01); *F16D 65/092* (2013.01); *F16D 2069/004* (2013.01); *F16D 2069/005* (2013.01)
USPC ........................................ 188/24.12; 188/242

(58) Field of Classification Search
CPC ............. B62L 1/005; B62L 1/06; B62L 1/10; B62L 1/12; B62L 1/14
USPC ......... 188/1.11 R, 1.11 W, 24.11, 24.12, 236, 188/242–245, 248, 251 A, 250 R, 252, 24.22
See application file for complete search history.

(56) References Cited

U.S. PATENT DOCUMENTS

| | | | | |
|---|---|---|---|---|
| 3,305,048 | A | * | 2/1967 | Brilando .................... 188/24.12 |
| 4,611,692 | A | * | 9/1986 | Everett ......................... 188/73.1 |
| 6,109,399 | A | * | 8/2000 | Crawford et al. ......... 188/250 B |
| 7,278,519 | B2 | * | 10/2007 | Iwai et al. ............... 188/1.11 W |
| 7,424,936 | B2 | * | 9/2008 | McClellan .............. 188/1.11 W |
| 2003/0155189 | A1 | * | 8/2003 | Everett ....................... 188/24.12 |
| 2005/0241888 | A1 | * | 11/2005 | Tsai ............................. 188/2 D |

* cited by examiner

*Primary Examiner* — Bradley King
*Assistant Examiner* — Stephen Bowes

(57) ABSTRACT

A brake block for bicycle includes a base which is made by plastic injection molding and a pad body made of rubber. The base has a fixing portion formed on one side thereof and a connecting portion formed on another side thereof. The connecting portion is connected with the fixing portion. The connecting portion has a plurality of necks connecting with the fixing portion and a connecting plate which is mounted on the necks. A gap is defined in two adjacent necks. The pad body has a braking portion formed on another side thereof for providing frictional effect. The pad body is partially filled into the gaps of the connecting portion of the base. The necks and the connecting plate are thoroughly covered by the pad body so that the base and the pad body form as an integral part.

4 Claims, 6 Drawing Sheets

BRAKE BLOCK FOR BICYCLE

CROSS-REFERENCE TO RELATED APPLICATION

This application is a Continuation-In-Part Application of U.S. application Ser. No. 12/753,115, filed 2 Apr. 2010, and entitled "BRAKE BLOCK FOR BICYCLE", now pending.

BACKGROUND OF THE INVENTION

1. Field of the Invention

The present invention relates to a brake block for bicycle, and more particularly, to a brake block which has a base made of plastic and a pad body made of rubber.

2. Description of Related Art

Cycling has become an extremely popular recreational activity throughout the world in recent decades. As more and more people indulge themselves in cycling, a demand for innovation and improvement of bicycles and bicycle parts has arisen.

A conventional brake block for bicycle is shown in FIG. 9. The conventional brake block is integrally and entirely made of rubber by press molding. The conventional brake block includes a braking surface 41 and an engaging part 42. A groove 43 is formed in an outer periphery of the engaging part 42 for engaging with a holder 5 of a bicycle brake shoe, such that a flange 51 on the holder 5 is engaged with the groove 43 for fixing the brake block 4 on the holder 5. Therefore, the braking surface 41 frictionally contacts with a wheel rim of a bicycle for providing a frictional effect.

However, the conventional brake block has the following drawbacks: first of all, the conventional brake block is integrally made of rubber by press molding. A tolerance range in size of the conventional brake block made by press molding is generally between +/−0.3. This huge tolerance range in size makes it difficult for the brake block to fittedly assemble with the holder 5, such that the brake block may easily detach from the holder 5. Furthermore, due to a deformable texture of rubber, the brake block is easily deformed when it is frictionally contacted with the wheel rim when operating, such that a frictional effect of the braking surface 41 is reduced. In addition, when the brake block is gradually and entirely worn, the holder 5 is exposed, and directly contacts with the wheel rim, thereby the holder is easily damaged.

The present invention has arisen to obviate/mitigate the disadvantages of the conventional.

SUMMARY OF THE INVENTION

The main objective of the present invention is to provide a brake block for bicycle.

To achieve the objective, the brake block for bicycle in accordance with the present invention comprises a base made of plastic and a pad body made of rubber, the base having a fixing portion formed at one side thereof and a connecting portion formed at another side thereof, the connecting portion connected with the fixing portion, the connecting portion comprising a plurality of necks connecting with the fixing portion and a connecting plate which is mounted on the necks, a gap being defined in two adjacent necks, one side of the pad body integrally covering the connecting portion, the pad body having a braking portion formed on another side thereof for providing frictional effect, the base manufactured by a plastic injection molding method, a rubber material chosen to form as the pad body, the pad body partially filled into the gaps of the connecting portion of the base, the necks and the connecting plate being thoroughly covered by the pad body so that the base and the pad body form as an integral part. Wherein, the fixing portion has a slot circumferentially defined in an outer periphery thereof adapted for slidably engaging with a holder of a bicycle brake shoe; the base and the pad body having different colors; the color of the base contrasting with that of the pad body for indicating wear of the pad body; the connecting plate has a high coefficient of friction, such that a friction sound bursts when the connecting plate is frictionally contacted for alerting wear of the pad body. Under this arrangement, the base and the pad body has a limited tolerance range in size, and is prevented from fracturing or deforming when operating.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
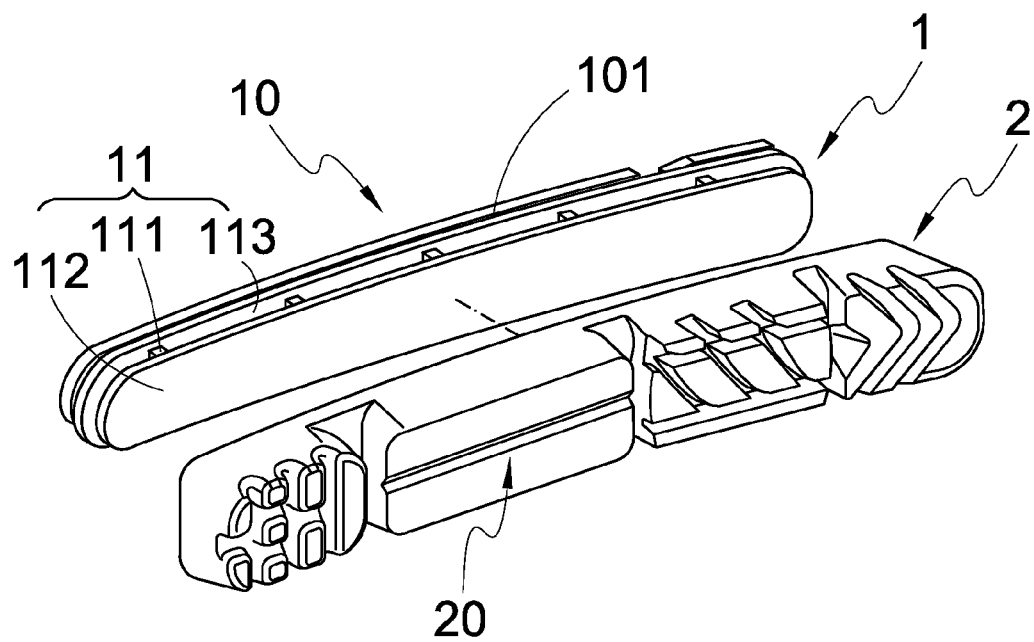
FIG. 1 is an exploded perspective view of a brake block for bicycle in accordance with the present invention.
Figure 2:
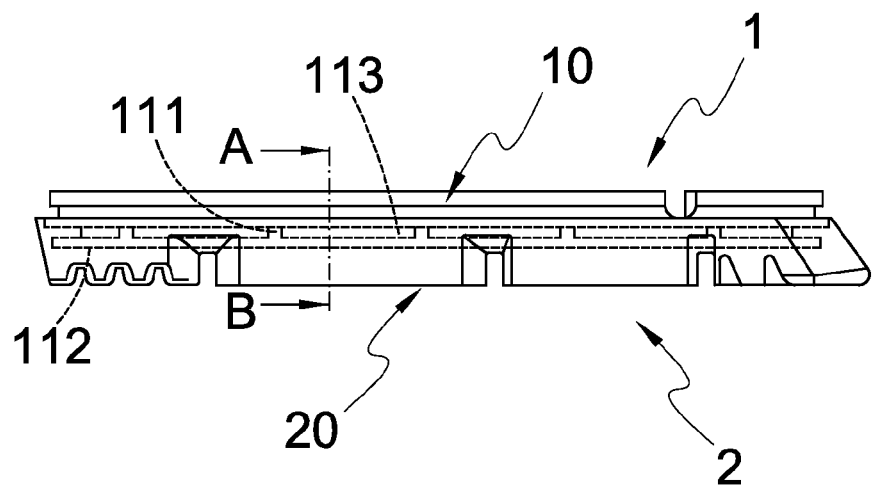
FIG. 2 is top plane view of the brake block for bicycle in accordance with the present invention.
Figure 3:
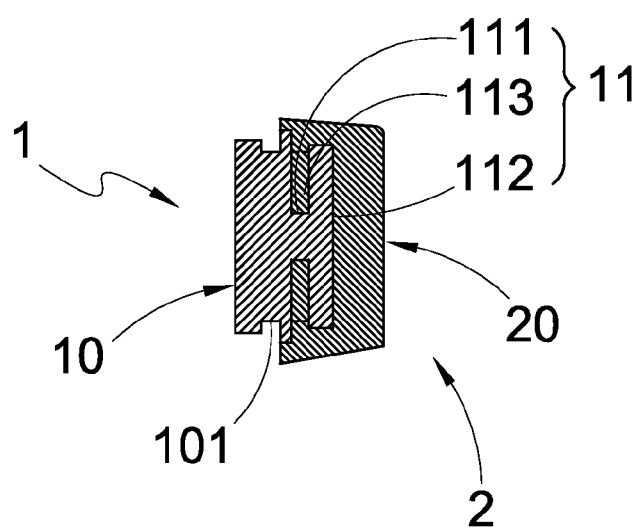
FIG. 3 is a cross-sectional view taken along segment A-B of FIG. 2.
Figure 4:
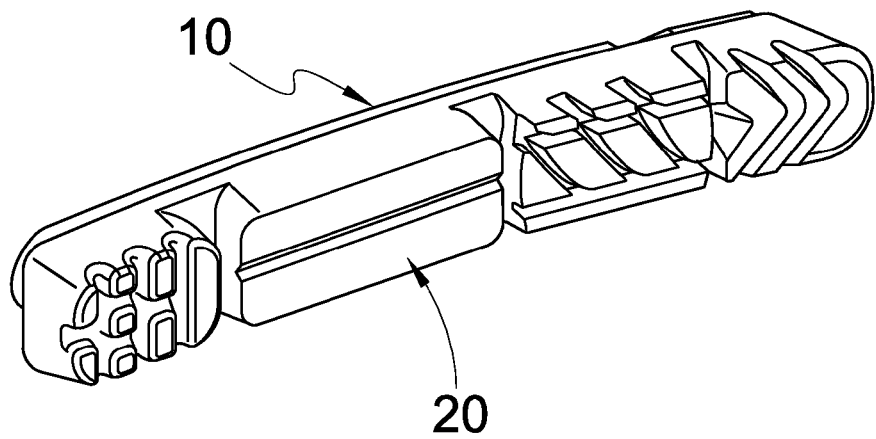
FIG. 4 is an assembled perspective view of the brake block for bicycle in accordance with the present invention.
Figure 5:
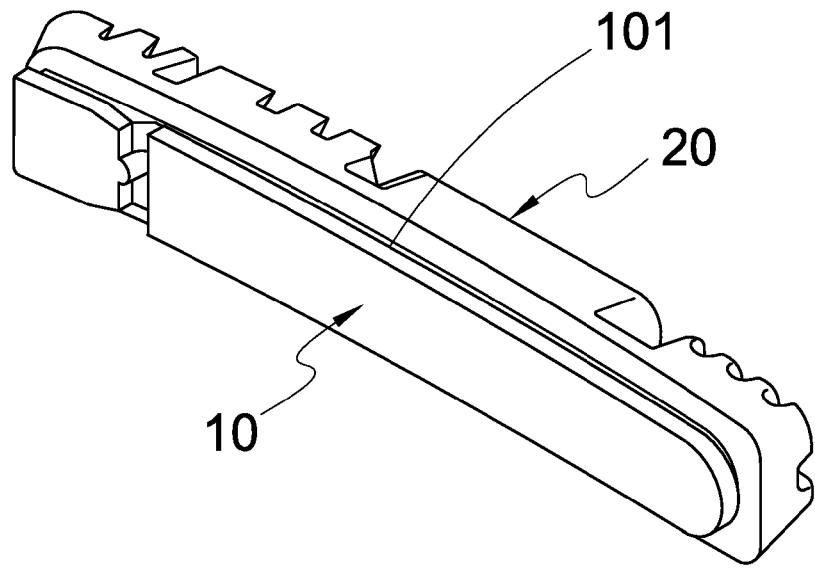
FIG. 5 is another assembled perspective view of the brake block for bicycle in accordance with the present invention viewing from a different angle.

Referring to the drawings and initially to FIGS. 1-5, a brake block for bicycle in accordance with the present invention comprises a base 1 made of plastic and a pad body 2 made of rubber. Both the base 1 and the pad body 2 are elongated shaped. The base 1 has a fixing portion 10 formed at one side thereof and a connecting portion 11 formed at another side thereof.

The fixing portion 10 has a slot 101 circumferentially defined in an outer periphery thereof for slidably engaging with a holder 3 of a bicycle brake shoe. The connecting portion 11 comprises at least one neck 111 connecting with the fixing portion 10 and a connecting plate 112 which is mounted on the at least one neck 111. In the present embodiment, the connecting portion 11 comprises a plurality of necks 111 connecting with the fixing portion 10. A gap 113 is defined in two adjacent necks 111. The connecting plate 112 has a high coefficient of friction, such that a friction sound bursts when the connecting plate 112 is frictionally contacted.

In order to produce said brake block, a method for producing the brake block for bicycle is described as following. Firstly, the base 1 is manufactured by a plastic injection molding method. Secondly, a rubber material is chosen to form as the pad body 2 and one side of the pad body 2 integrally covers the connecting plate 112 and is partially fill into the gaps 113 of the connecting portion 11 of the base 1. As a result, the necks 111 and the connecting plate 112 are thoroughly covered by the pad body 2. Therefore, the base 1 and the pad body 2 formed an integral part, so that the base 1 and pad body 2 are structurally enhanced. The pad body 2 has a braking portion 20 formed on another side thereof for providing a frictional effect to a wheel rim of a bicycle (not shown). The base 1 and the pad body 2 have different colors. The color of the base 1 is contrasting with that of the pad body 2 for indicating wear of the pad body 2.

Figure 6:
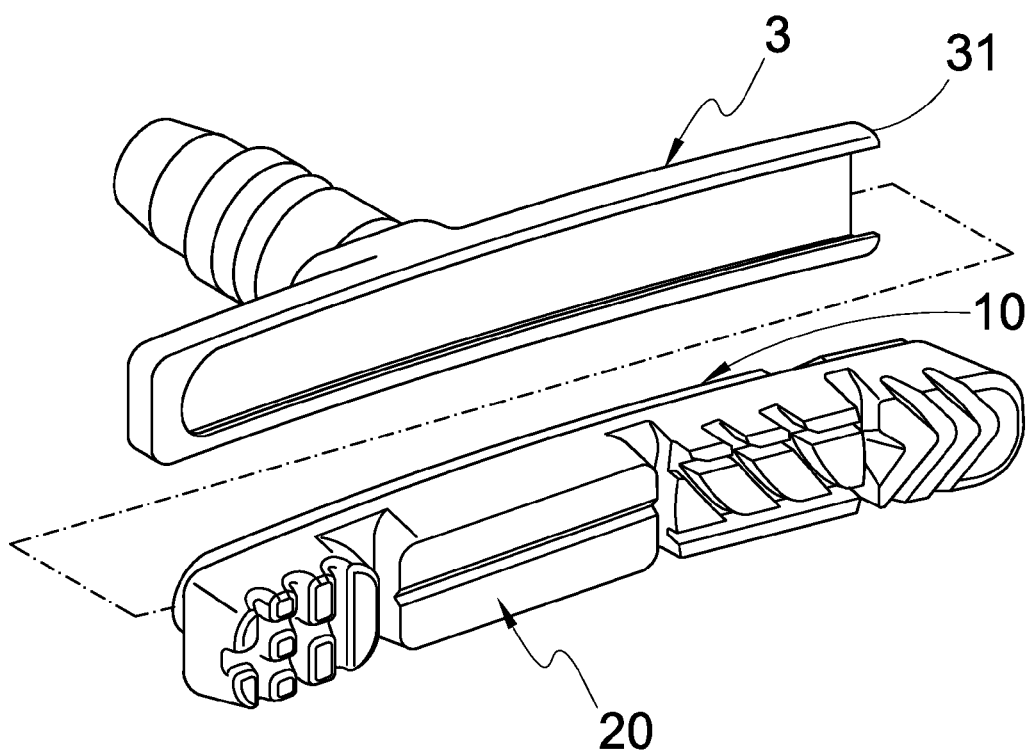
FIG. 6 is an exploded perspective view of a holder for bicycle brake shoe and the brake block for bicycle in accordance with the present invention.
Figure 7:
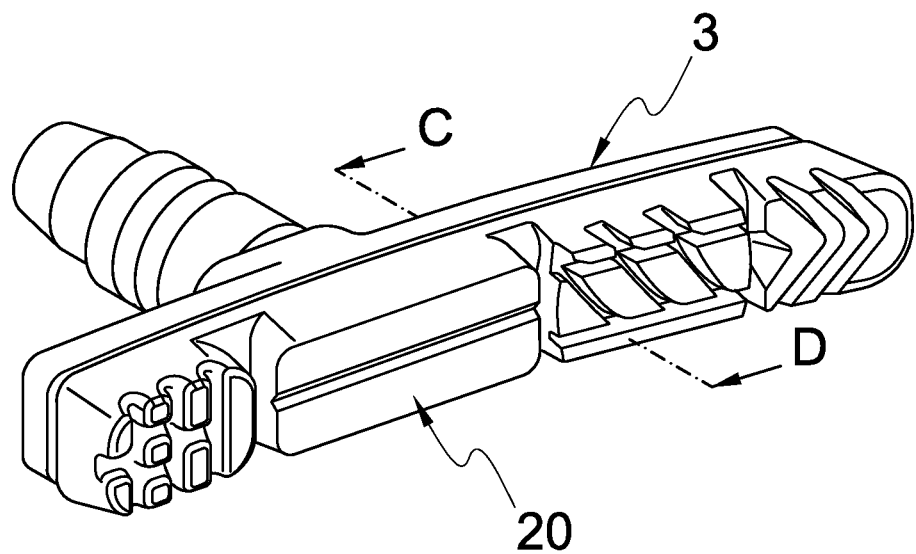
FIG. 7 is a perspective view of the brake block for bicycle assembled to the holder for bicycle brake shoe in accordance with the present invention.
Figure 8:
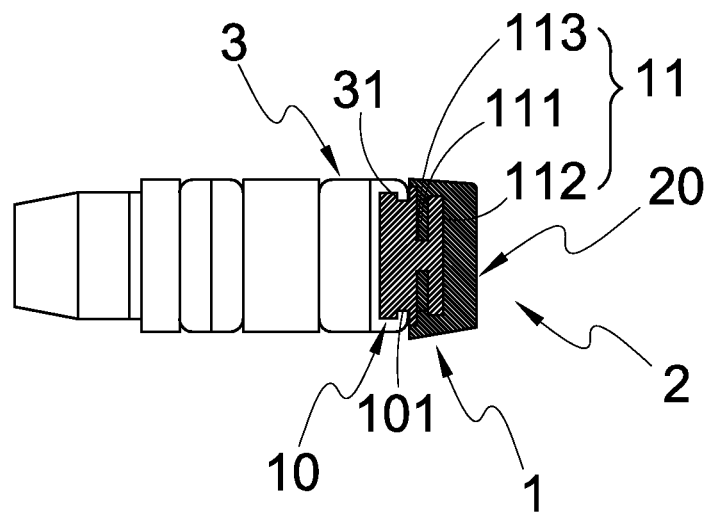
FIG. 8 is cross-sectional view taken along segment C-D of FIG. 7.
Figure 9:
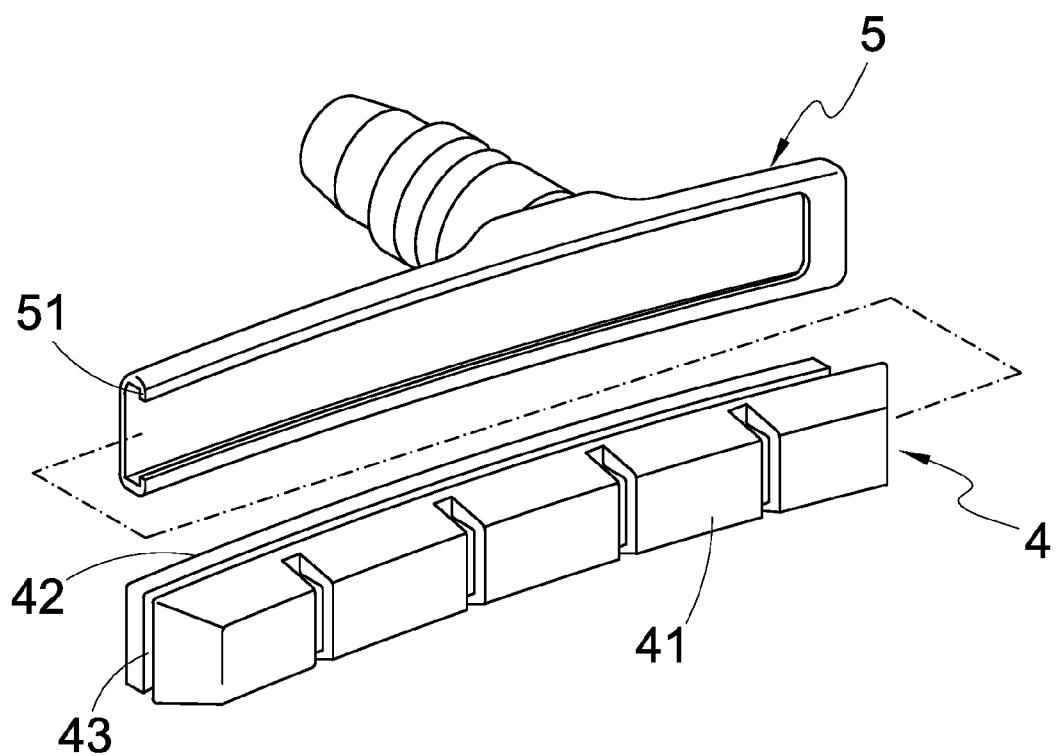
FIG. 9 is an exploded perspective view of a brake block and a holder for bicycle brake shoe in accordance with prior art.

Further referring to FIG. 6 to FIG. 8, which shows the brake block in accordance with the present invention assembled with the holder 3 of bicycle brake shoe. The holder 3 has a holder rail 31 extending therefrom and invertedly inclined toward one another. A stud portion (shown in FIGS. 6, 7 and 8, but not numbered) is employed for engagement with a caliper brake arm (not shown) of the bicycle, as known in the art. The base 1 is slidably engaged with the holder rails 31 of the holder 3 by the slot 101 circumferentially defined in the outer periphery of the fixing portion 10, such that the fixing portion 10 is embedded in the holder 3 (as shown in FIG. 8) for the base 1 to be securely assembled with the holder 3.

In view of the above descriptions, the brake block in accordance with the present invention has the following advantages: first of all, the base 1 is made by plastic injection molding, such that a tolerance range in size can be reduced to +/−0.05 which is relatively small compares to that of the brake block in accordance with the prior art which is entirely made of rubber by press molding. Therefore, the base 1 can be fittedly assembled with the holder 3 to prevent coming off of the base 1 from the holder 3. Secondly, due to a harder texture of plastic compares to that of rubber, the base 1 is not deformable when being compressed; hence the base 1 rigidly supports the pad body 2 to enhance the frictional effect of the braking portion 20 of the pad body 2 to the wheel rim. Such that the braking portion 20 tightly abuts against the wheel rim to consistently provide a frictional effect in operating state, and the braking portion 20 is not deformed easily with the support from the base 1. Thirdly, since the braking block is structurally enhanced by the integral part of the base 1 and the pad body 2, to depart said components with each other is rather difficult so as to extend a usage life of the braking block.

In addition, the color of the base 1 contrasts with that of the pad body 2. By the contrasting colors of the base 1 and the pad body 2, a user can easily identify the wear of the pad body 2, which allows the user to immediately and instantly replace the brake block when the pad body 2 is worn. Furthermore, the connecting plate 112 of the base 1 bursts a friction sound when it is frictionally contacted due to the high coefficient of friction of the connecting plate 112 of the connecting portion 11, such that the user is immediately alerted the wear of the pad body 2 by the friction sound. The connecting plate 112 of the connecting portion 11 also protects the holder 3 from frictionally contacting with the wheel rim when the pad body 2 is worn. Thereby, a usage life of the holder 3 is prolonged.

Although the invention has been explained in relations to its preferred embodiment, it is to be understood that many other possible modifications and variations can be made without departing from the spirit and scope of the invention as hereinafter claimed.

What is claimed is:

1. A bicycle brake assembly for attachment to a caliper brake arm of a bicycle, comprising:
   a brake shoe member including a stud portion for engagement with the caliper brake arm, and a holder with a holder rail; and
   a brake block mounted on the holder of the brake shoe member and including a base made of plastic and a pad body made of rubber, the rubber pad body being molded onto the plastic base, the base having a fixing portion formed at one side thereof and a connecting portion formed at another side thereof;
   the fixing portion of the base having a slot circumferentially defined in an outer periphery thereof, and the fixing portion being slidably engaged with the holder of the brake shoe member with the slot riding along the holder rail of the holder;
   the connecting portion of the base securely embedded in one side of the pad body;
   the pad body having a braking portion formed on another side thereof for providing frictional effect.

2. The bicycle brake assembly as claimed in claim 1, wherein the connecting portion of the base has a substantially T-shaped cross section securely embedded in the pad body.

3. The bicycle brake assembly as claimed in claim 1, wherein the base and the pad body having different colors; the color of the base contrasting with that of the pad body for indicating wear of the pad body.

4. The bicycle brake assembly as claimed in claim 1, wherein the connecting plate has a high coefficient of friction, such that a friction sound bursts when the connecting plate is frictionally contacted for alerting wear of the pad body.

* * * * *